United States Patent
Chen

(10) Patent No.: US 7,233,232 B2
(45) Date of Patent: Jun. 19, 2007

(54) PORTABLE MULTI-PURPOSE UNIVERSAL SERIAL BUS STRUCTURE

(76) Inventor: Ying-Chung Chen, No. 139, Wu Kung Rd., Wu Ku Hsiang, Taipei Hsien (TW)

( * ) Notice: Subject to any disclaimer, the term of this patent is extended or adjusted under 35 U.S.C. 154(b) by 191 days.

(21) Appl. No.: 11/062,837

(22) Filed: Feb. 23, 2005

(65) Prior Publication Data

US 2006/0190664 A1 Aug. 24, 2006

(51) Int. Cl.
- *B60Q 25/10* (2006.01)
- *A45C 11/32* (2006.01)
- *H01R 13/44* (2006.01)
- *G06F 13/20* (2006.01)
- *G06F 12/00* (2006.01)

(52) U.S. Cl. ............... 340/426.13; 340/426.35; 340/5.6; 711/115; 206/37.1; 206/37.5; 439/131; 710/313

(58) Field of Classification Search ......... 340/426.13, 340/426.35, 426.36, 5.6, 5.64; 711/100, 711/111, 162, 4, 115; 70/336, 344, 393, 70/395, 397, 448, 456 R; 206/37.5, 37.8, 206/37.1; 439/207, 133, 131, 136, 528; 710/305, 710/313; 361/686, 737, 752

See application file for complete search history.

(56) References Cited

U.S. PATENT DOCUMENTS

| | | | |
|---|---|---|---|
| 2003/0097351 A1* | 5/2003 | Rothschild et al. | 707/1 |
| 2003/0231550 A1* | 12/2003 | Macfarlane | 367/198 |
| 2004/0158371 A1* | 8/2004 | Iggulden et al. | 701/29 |
| 2005/0109841 A1* | 5/2005 | Ryan et al. | 235/380 |
| 2005/0240692 A1* | 10/2005 | Li | 710/62 |
| 2005/0277438 A1* | 12/2005 | Tilk et al. | 455/556.1 |
| 2006/0049922 A1* | 3/2006 | Kolpasky et al. | 340/426.13 |
| 2006/0208066 A1* | 9/2006 | Finn et al. | 235/380 |

* cited by examiner

*Primary Examiner*—Toan N. Pham
(74) *Attorney, Agent, or Firm*—Leong C. Lei

(57) ABSTRACT

The present invention is a portable multi-purpose universal serial bus (USB) structure, which refers to a storage unit that can be provided inside a casing and has a USB connector exposed out of one end of the casing. The casing can be a casing for a key, a vehicle anti-theft alarm, a controller of an electric roller gate, or a receiver of an entrance guard card, thereby avoiding the user from forgetting to carry said objects when going out and therefore from incurring any inconvenience.

3 Claims, 3 Drawing Sheets

PORTABLE MULTI-PURPOSE UNIVERSAL SERIAL BUS STRUCTURE

BACKGROUND OF THE INVENTION (a) Technical Field of the Invention

The present invention relates to a portable multi-purpose universal serial bus (USB), particularly to one that can avoid the user from forgetting to carry the relevant objects when going out and therefore from incurring any inconvenience.

(b) Description of the Prior Art

For storing and carrying computer data for accession by another computer, people, especially working persons and students, always utilize a portable storage as a medium, which is so called "multi-purpose universal serial bus (USB) structure". USB is favorable to the user given its easy carried compact size, especially to those business persons and students. However, compact size USB is easy carried and easy lost as well. The user might suffer serious damage due to the loss of the USB.

In view of the above, the inventor has positively researched to improve the USB of the prior art, and thus disclosed the invention which can avoid the user from forgetting to carry it therewith, thus increasing the utilities of the related objects.

SUMMARY OF THE INVENTION

The primary purpose of the present invention is to provide a portable multi-purpose universal serial bus (USB) structure, which can avoid the user from forgetting to carry it therewith, and therefore from incurring any inconvenience.

To obtain the above objects, the invention disclosed a portable multi-purpose USB structure, which refers to a storage unit provided inside a casing and has a USB connector exposed out of one end of the casing. The casing can be a casing for a key, a vehicle anti-theft alarm, a controller of an electric roller gate or a receiver for an entrance guard card.

To completely appreciate these and other objects of the present invention as well as the invention itself, all of which will become apparent to those skilled in the art, the following detailed description of the invention and the claims should be read in conjunction with the accompanying drawings.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
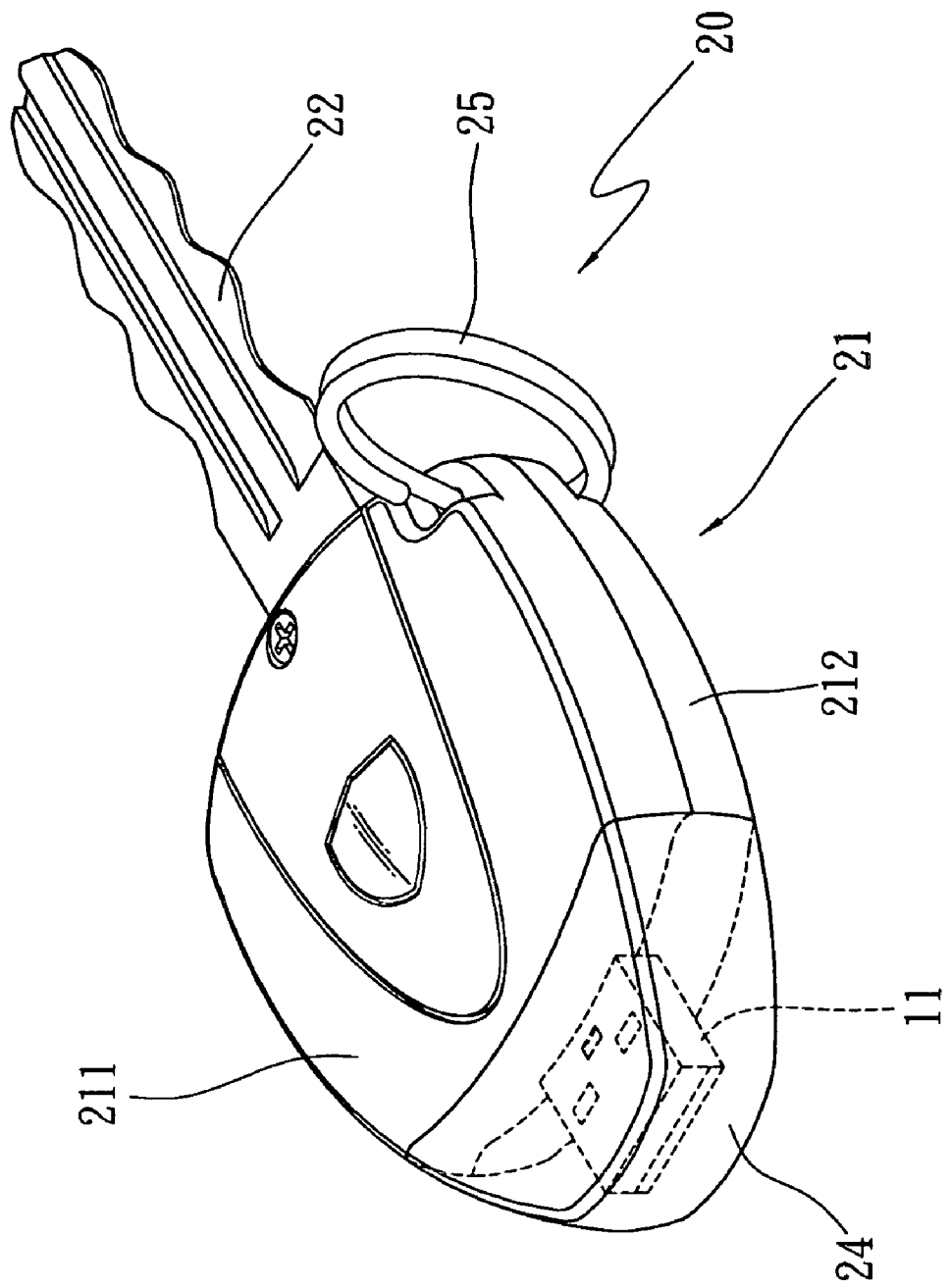
FIG. 1 is a perspective view of the first embodiment of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in the drawings, the portable multi-purpose universal serial bus (USB) structure according to the invention refers to a storage unit 10 provided inside a casing and has a USB connector 11 exposed out of one end of the casing. The casing can be a casing for a key, a vehicle anti-theft alarm, a controller of an electric roller gate or a receiver for an entrance guard card, thereby avoiding the user from forgetting to carry the relevant objects therewith when going out, and therefore from incurring any inconvenience.

Figure 2:
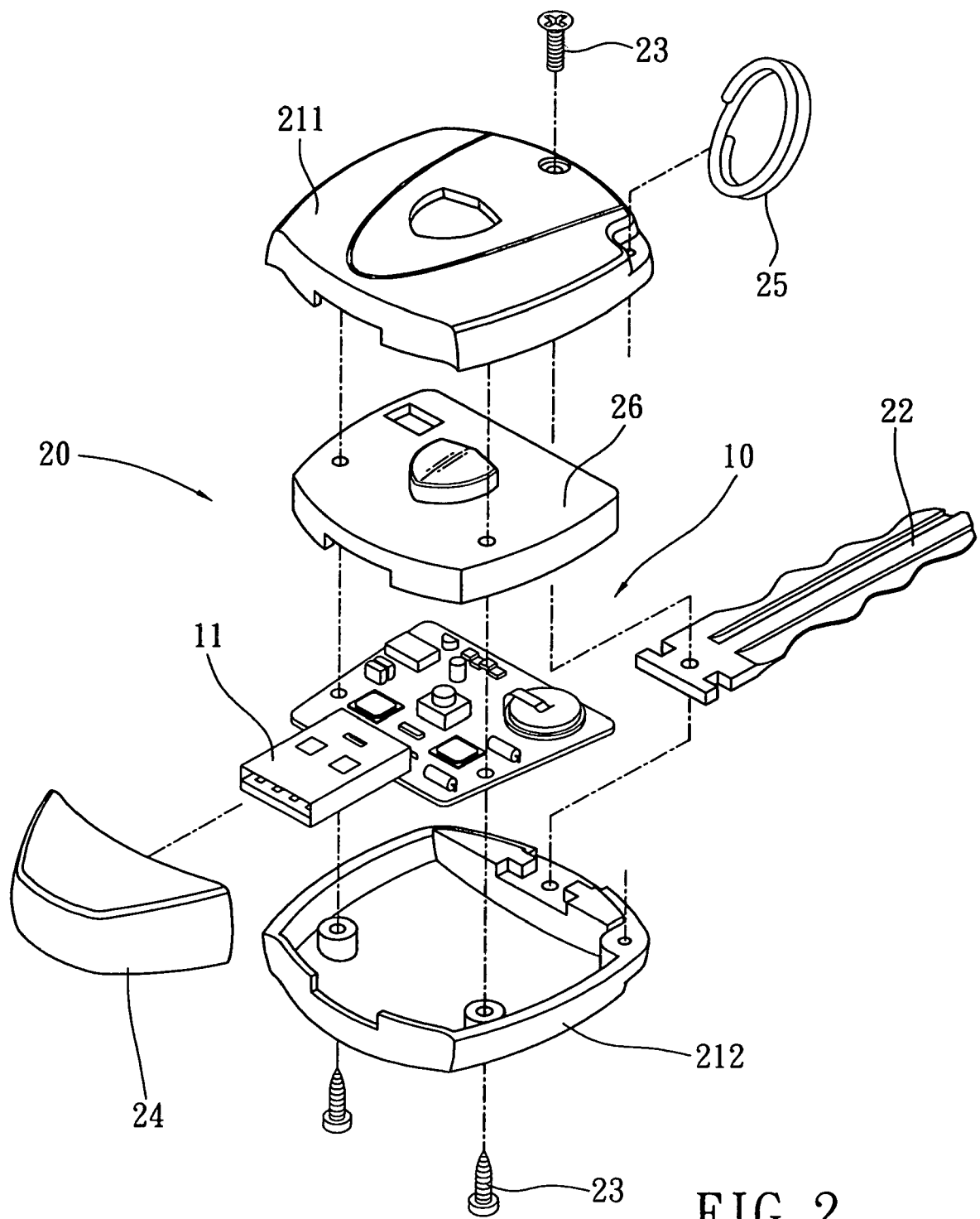
FIG. 2 is an exploded view of the first embodiment of the present invention.

Refer to FIGS. 1 and 2, when said casing is prepared for a key 20 of a vehicle anti-theft alarm, which is, as shown, composed of a casing 21, and a key rod 22 fastened to one end of the casing 21. The casing 21 includes an upper cover 211 and a lower cover 212, which are combined via screws 23 or locked together via locking elements (not shown). The storage unit 10 is invisibly provided inside the casing 21 of the key 20, while the USB connector 11 is exposed out of one end of the casing 21. A water-proof gasket 26 is provided between the upper cover 211 and the storage unit 10. A cap 24 covers the front end of the casing. The storage unit 10 is combined with the controller of the anti-theft alarm, which has a press button exposed on one side of the casing, while the casing can be bored with a key ring 25. Besides, the casing can be prepared as that for a general key, such that the storage unit 10 is disposed inside the casing (as is with the prior art), and the USB connector 11 is exposed out one end of the casing.

Figure 3:
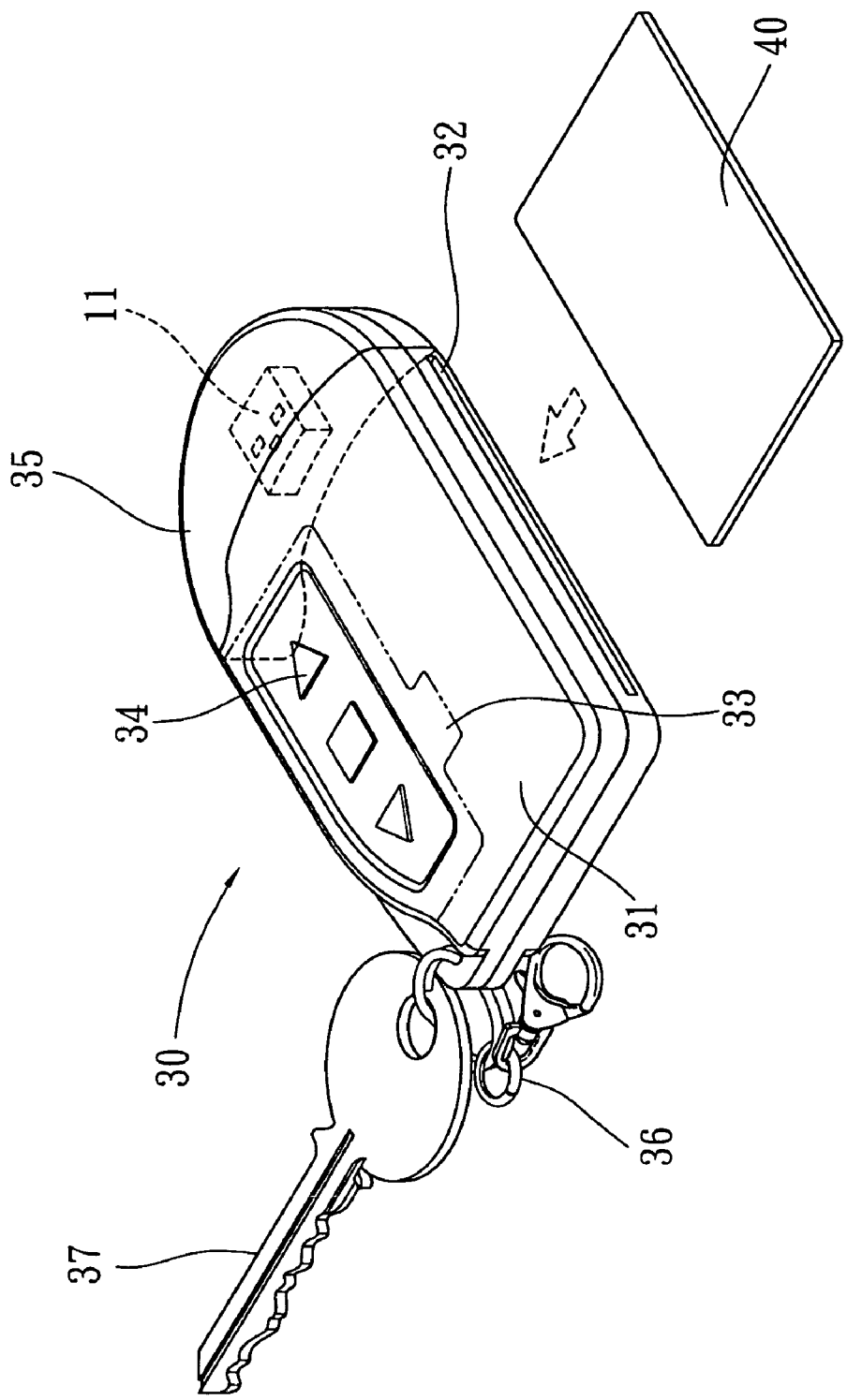
FIG. 3 is a perspective view of the second embodiment of the present invention.

Furthermore, as in the embodiment shown in FIG. 3, the casing 30 is prepared for a controller of an electric roller gate of a garage, a receiver of an entrance guard card or a combination of the aforesaid objects. While the casing 30 may have the function of controlling the electric roller gate of a garage, it is at least provided at one side thereof with a socket 32 for receiving an entrance guard card 40. The controller 31 is composed of a control circuit unit 33 (as is with the prior art) provided inside the casing, and pluralities of function keys 34 for selection purpose. The storage unit 10 is provided inside the casing 30 and has a USB connector 11 exposed out of one end of the casing 30. The casing 30 is covered by a cap 35 and can be bored with a key ring 36 for further connecting with a key 37.

Concluded above, the portable multi-purpose universal serial bus (USB) structure according to the invention can efficiently improve the disadvantages existent in the prior arts, avoid the user from forgetting to carry the relevant objects therewith when going out, and therefore form incurring any inconvenience.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A portable multi-purpose universal serial bus (USB) structure, including:
    a key, which is composed of a casing, and a key rod fastened to one end of the casing; and
    a storage unit, which is provided inside the casing and has a USB connector exposed out of one end of the casing.

2. The portable multi-purpose universal serial bus (USB) structure according to claim 1, wherein the casing is composed of an upper cover and a lower cover.

3. The portable multi-purpose universal serial bus (USB) structure according to claim 1, wherein the storage unit can provide connection of a vehicle anti-theft alarm key and a controller.

* * * * *